(12) United States Patent
Chapman, Jr. et al.

(10) Patent No.: US 7,460,933 B2
(45) Date of Patent: Dec. 2, 2008

(54) THERMOSTAT DISPLAY SYSTEM PROVIDING ADJUSTABLE BACKLIGHT AND INDICATORS

(75) Inventors: John Gilman Chapman, Jr., Delaware, OH (US); George N Catlin, Grove City, OH (US); Brian Hockensmith, Columbus, OH (US)

(73) Assignee: Ranco Incorporated of Delaware, Wilmington, DE (US)

( * ) Notice: Subject to any disclaimer, the term of this patent is extended or adjusted under 35 U.S.C. 154(b) by 436 days.

(21) Appl. No.: 11/216,405

(22) Filed: Aug. 31, 2005

(65) Prior Publication Data

US 2007/0045430 A1  Mar. 1, 2007

(51) Int. Cl.
*G05D 23/00* (2006.01)
*G09G 3/36* (2006.01)
(52) U.S. Cl. ............................ 700/300; 345/102; 236/94
(58) Field of Classification Search ................. 700/300; 345/102; 236/91 D, 91 R, 94; 324/417; D10/50
See application file for complete search history.

(56) References Cited

U.S. PATENT DOCUMENTS

| | | | |
|---|---|---|---|
| 3,930,611 A | 1/1976 | Demaray | |
| 4,282,591 A | 8/1981 | Andreuccetti | |
| 4,288,990 A | 9/1981 | Schulz | |
| 4,298,946 A * | 11/1981 | Hartsell et al. | 700/278 |
| 4,388,692 A * | 6/1983 | Jones et al. | 700/278 |
| 4,462,540 A | 7/1984 | Dytch | |
| 4,969,508 A | 11/1990 | Tate et al. | |
| 5,082,173 A | 1/1992 | Poehlman et al. | |
| 5,189,412 A | 2/1993 | Mehta et al. | |
| 5,271,558 A | 12/1993 | Hampton | |
| 5,272,477 A | 12/1993 | Tashima et al. | |
| 5,595,342 A | 1/1997 | McNair et al. | |
| 5,803,357 A | 9/1998 | Lakin | |
| 5,833,134 A | 11/1998 | Ho et al. | |
| 5,924,486 A | 7/1999 | Ehlers et al. | |
| 6,032,867 A * | 3/2000 | Dushane et al. | 236/51 |
| 6,116,512 A | 9/2000 | Dushane et al. | |
| 6,213,404 B1 | 4/2001 | Dushane et al. | |
| 6,449,533 B1 | 9/2002 | Mueller et al. | |
| 6,513,723 B1 | 2/2003 | Mueller et al. | |
| 6,995,518 B2 * | 2/2006 | Havlik et al. | 315/169.3 |

(Continued)

FOREIGN PATENT DOCUMENTS

WO    WO 02/05052 A1    1/2002

OTHER PUBLICATIONS

Theta Engineering, "Smart" Thermostat, website, date last visited Oct. 26, 2006, previously visited Oct. 27, 2005, 3 pages, http://www.thetaeng.com/SmartThermostat.htm.

*Primary Examiner*—M.N. Von Buhr
(74) *Attorney, Agent, or Firm*—Reinhart Boerner Van Deuren P.C.

(57) ABSTRACT

A user adjustable visual display system and method for a digital thermostat having a backlit user display screen and system operation indicators is provided. The system allows a user to programmatically vary the illumination intensity of the backlit user display screen and the operational indicators. The variance provided includes disabling of the backlight and operational indicators. The system utilizes a variable pulse width modulated (PWM) intensity control for the backlight and indicators. Alternatively, an adjustable current drive illumination control is used to control the backlight and indicators. The selection of the desired intensity is provided via a display settings menu accessed via the user display screen.

14 Claims, 2 Drawing Sheets

U.S. PATENT DOCUMENTS

| | | | |
|---|---|---|---|
| 7,114,554 B2 * | 10/2006 | Bergman et al. | 165/238 |
| 7,140,551 B2 * | 11/2006 | de Pauw et al. | 236/94 |
| 7,156,318 B1 * | 1/2007 | Rosen | 236/94 |
| 7,225,054 B2 * | 5/2007 | Amundson et al. | 700/276 |
| 7,287,709 B2 * | 10/2007 | Proffitt et al. | 236/94 |
| 7,299,996 B2 * | 11/2007 | Garrett et al. | 236/94 |
| 2001/0048030 A1 | 12/2001 | Sharood et al. | |
| 2004/0074978 A1 * | 4/2004 | Rosen | 236/1 C |
| 2004/0133314 A1 | 7/2004 | Ehlers et al. | |
| 2004/0260427 A1 | 12/2004 | Wimsatt | |
| 2005/0043907 A1 | 2/2005 | Eckel et al. | |
| 2005/0194457 A1 | 9/2005 | Dolan | |
| 2006/0165149 A1 * | 7/2006 | Kolk | 374/1 |
| 2007/0279368 A1 * | 12/2007 | Shefter | 345/102 |

* cited by examiner

THERMOSTAT DISPLAY SYSTEM PROVIDING ADJUSTABLE BACKLIGHT AND INDICATORS

FIELD OF THE INVENTION

The present invention relates generally to digital thermostats, and more particularly to a display system for a digital thermostat to convey system operating information to a user.

BACKGROUND OF THE INVENTION

Occupants of dwellings and commercial structures have long benefited from the inclusion of a heating, ventilating, and air conditioning (HVAC) system that regulates the temperature and humidity within the dwelling or structure. Traditionally, the thermostat that controlled this temperature regulating equipment was a fairly simple electromechanical device that was simply wired to a heating device and/or to a cooling device. Once installed, the user need only move a selector switch between heating and cooling to designate which equipment was desired to be operated, move a selector switch between run and auto for a fan control, and rotate a dial to a desired set point temperature. No other user interface to the thermostat was needed or available, and no indication of system operation was provided.

Advances in control electronics have allowed the development of new, digital thermostats that may be programmed by a user to control the heating and cooling equipment in a much more energy efficient manner than the older electromechanical devices. These modern digital thermostats allow programming that can automatically set back the heat, for example, during periods when the dwelling or structure is not occupied, and can turn up the heat just prior to and during periods of occupation of the dwelling or structure. Indeed, many such digital thermostats allow for different programming options during different days of the week. For example, such a digital thermostat may provide for one programmed operation during the week and a different programmed operation on the weekend, to accommodate the different usage patterns of the occupants of that particular dwelling or structure.

While the advances that are being included in modern digital thermostats greatly enhance the users' comfort level and minimize the energy usage, the overall user experience interfacing with such a digital thermostat has not kept pace. Specifically, while such digital thermostats typically provide some form of user interface screen from which information is conveyed to the consumer, and from which the consumer may program the operation of the thermostat, such displays do not provide any indication that the heating or cooling equipment in the home is active.

To provide such indication of the operational status of the heating and/or cooling equipment, such digital thermostats now often include light emitting diode (LED) type indicators that illuminate when the heating and/or cooling equipment in the home is active. This provides an immediate visual indication of the operational status of the heating and/or cooling equipment. However, such LED indicators have led to several consumer complaints, and in some cases, reduction in performance of the thermostat itself.

Because an LED indicator needs to be bright enough to be visible during the daylight hours or within a lighted room to be effective, the amount of light output can be quite high. Unfortunately, many consumers have complained that such an LED indication is annoying, distracting, and unwanted in several situations. One such situation is when the thermostat is installed in, for example, a home theater where such a bright LED indicator detracts from the home theater experience. Another is when the thermostat is installed in a bedroom or other area where such a bright LED indicator would prove to be annoying.

In each of these types of situations, it has been known that consumers have used black electrical tape or other opaque tape to cover the LED indicators. While this solution removes the annoyance and distraction caused by the LED indicators, the consumer is left with no indication of the operational status of the heating and/or cooling equipment. The user is then forced to repeatedly remove the tape to determine the operational status, and replacing the tape when such LED indication would prove annoying or distracting. It has also been known for users to modify the internal electronics of the thermostat to disable the indicators altogether. However, such modification of the electronics may lead to spurious operation of the thermostat, damage to the thermostat, risk to the consumer, etc.

Another source of annoyance is from the intensity of the illumination of the backlit user display. Since many digital thermostats include a user display screen, e.g. a liquid crystal display (LCD), backlight illumination needs to be provided so that the information on the screen can be read in low light situations. To ensure that the information can be read clearly in different lighting conditions, the intensity of the backlight illumination is typically quite high. However, when the thermostat is accessed during the night or when it is quite dark in the room in which the thermostat is installed, the intensity of the backlight illumination is overwhelming, particularly to consumers whose eyes have adjusted to the dark.

There exists, therefore, a need in the art for a user adjustable display system for a digital thermostat that allows a user to adjust and/or disable the visual indication of the operational status of the heating and/or cooling equipment and the backlight illumination intensity of the user display.

The invention provides such a digital thermostat display system. These and other advantages of the invention, as well as additional inventive features, will be apparent from the description of the invention provided herein.

BRIEF SUMMARY OF THE INVENTION

The present invention provides a new and improved digital thermostat. More particularly, the present invention provides a new and improved digital thermostat having a display system that allows a user to enable and disable an indication of heating and cooling system operating information. Even more particularly, the present invention provides a new and improved digital thermostat having a display system that allows a user to adjust the intensity of the indication of heating and cooling system operating information. Still further, the present invention provides a new and improved digital thermostat having a display system that allows a user to enable and disable the backlight illumination of a user display screen. Further, the present invention provides a new and improved digital thermostat having a display system that allows a user to adjust the intensity of the backlight illumination of the user display screen.

In one embodiment of the present invention for which the display system of the present invention finds particular applicability, a digital thermostat includes at least one indicator light. Typically, this indicator light is an LED indicator that may be used for various functions, including display of the operational status of the heating and/or air conditioning system equipment. The display system of the present invention allows the user the ability to adjust the illumination intensity provided by the indicator. In a preferred embodiment, the system of the present invention allows a user to adjust the display intensity from full on to full off as desired by the user.

In another embodiment of the present invention, wherein the thermostat includes a backlit user display screen, the system of the present invention also provides the ability for a user to adjust the intensity of the backlight illumination. Preferably, the system of the present invention allows the user to adjust the backlight illumination intensity from full on to full off.

In an embodiment of the present invention wherein the thermostat includes both LED indicators and a backlit user display screen, the system of the present invention preferably provides the ability to adjust the display intensities of both the backlit user display screen and the LED indicators. In such a system, the user is able to control the intensity of each of these elements from full on to full off as desired by the user.

In a highly preferred embodiment, the control of the display intensity is provided through a menu driven interface to the user. Preferably, this menu driven interface allows a user to set their display preferences via the user display screen. In an embodiment wherein the display intensity may be represented on a scale from zero to ten, wherein ten signifies maximum illumination intensity and zero signifies no illumination, the user is able to scroll through and select an intensity that suits their preference. In other embodiments, different steps may be provided, including a continuous intensity adjustment.

In one embodiment of the present invention, the illumination intensity of the LED indicators and/or backlight of the user display screen is controlled via a pulse with modulated (PWM) controlled output that drives the indicators and/or backlight. The software of the thermostat, preferably via the menu driven user interface, can adjust the intensity of the indicators and/or backlight from full intensity (via 100% duty cycle or high current pulses without going completely on) to completely off. In addition, the PWM control allows the user to set many other intensity levels, e.g., 25%, 50%, 75%, etc. as desired. These other intensity levels may not be as annoying to the user while still allowing the indicators and/or backlit user display to perform the function for which they were originally intended.

In an alternate embodiment of the present invention, an adjustable current drive may be used to provide the brightness control. This adjustable current drive provides consistent brightness control. The software of the thermostat, preferably via the menu driven user interface, can adjust the intensity of the indicators and/or backlight from 100% to completely off. By allowing the continuous brightness control, the user should be able to set the brightness to other intensity levels that may not be as annoying to the user while still allowing the indicators and/or backlit user display to perform the function for which they were originally intended.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Figure 1:
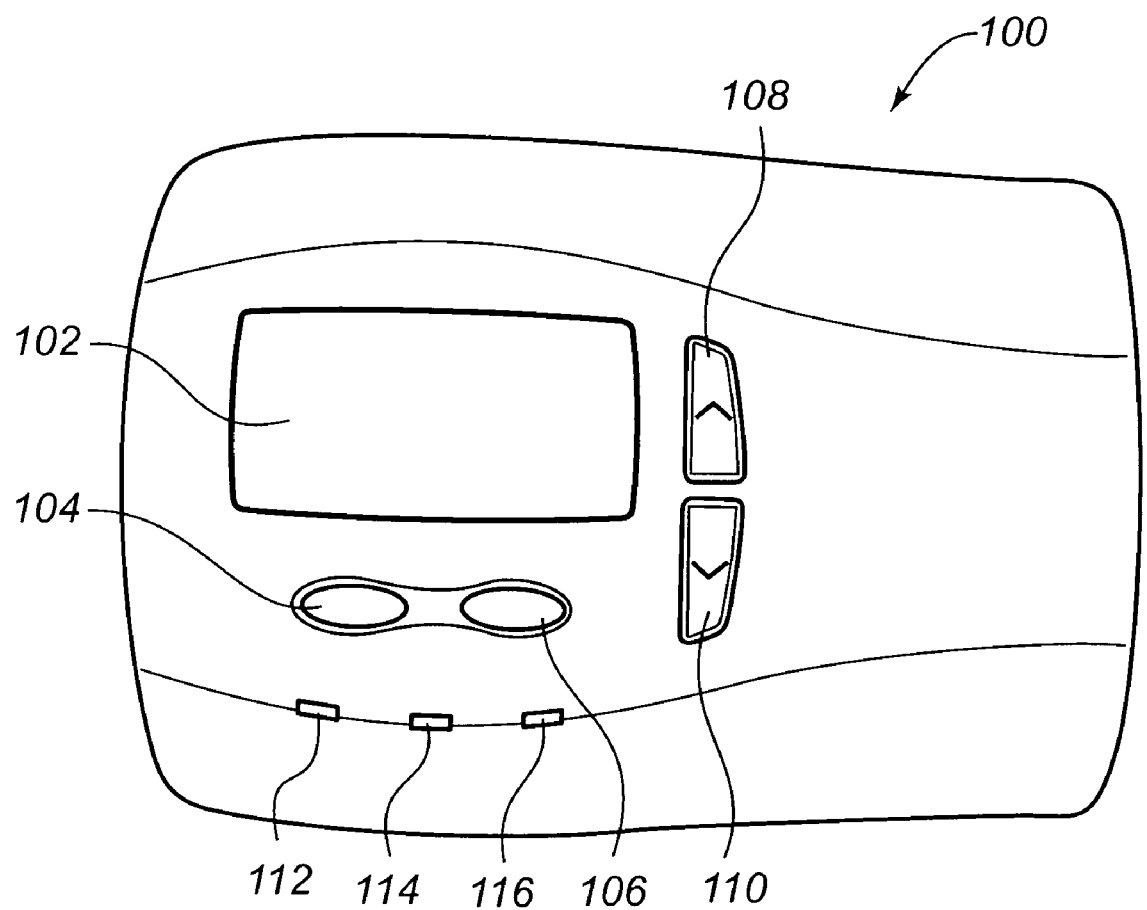
FIG. 1 is a top view illustration of an embodiment of a thermostat constructed in accordance with the teachings of the present invention.

An embodiment of a thermostat constructed in accordance with the teachings of the present invention that incorporates the display system of the present invention is illustrated in FIG. 1. As with many thermostats, an internal temperature sensor that is monitored by the internal processor is included within the thermostat 100. As may be seen from this FIG. 1, this embodiment of the thermostat 100 includes a user display 102 on which is displayed programmatic, system, and ambient information regarding the operation of the HVAC system. This user display 102 may take various forms as are well known in the art, and in a preferred embodiment is a dot matrix LCD display. The user display screen 102 may be selectively illuminated by backlight illumination, and therefore may be referred to as a backlit user display screen 102. The control of the intensity of this illumination in accordance with the system of the present invention will be discussed more fully below.

With such a display 102, the consumer may activate various programmatic and control functions via a pair of soft keys 104, 106. The functionality executed by these soft keys 104, 106 varies dependent upon the programmatic state in which the thermostat 100 is at the time one of the soft keys 104, 106 is depressed. The particular functionality that will be instituted upon selection of one of the soft keys 104, 106 is displayed in an area of the user display 102 proximate the key 104, 106 which will institute that function. That is, the function that will be instituted upon selection of soft key 104 will be located generally in the lower left hand portion of user display 102 while the functionality that will be instituted by selection of soft key 106 will be located generally in the lower right hand portion of user display 102. These functional indicators may change depending on the program state and mode in which the thermostat is currently operating.

In addition to the soft keys 104, 106, this embodiment of the thermostat 100 of the present invention also includes adjustment keys 108, 110. These adjustment keys 108, 110 may serve to adjust a currently selected parameter up or down, such as in the case of setting the control temperature at which the thermostat will maintain the ambient environment. Additionally, these keys 108, 110 may scroll through the available data for a selected parameter, such as scrolling through alphanumeric data that may be selected for a given parameter. These keys 108, 110 may also function as soft keys depending on the programmatic state in which the thermostat is operating. When this functionality is provided, the function that will be instituted by selection of key 108 will be provided generally in the upper right hand corner of display 102, while the functionality that will be instituted by selection of key 110 will be displayed generally in the lower right hand corner of user display 102. In addition to the above, other use input means, such as an alphanumeric keypad, user rotatable knob, a touch screen, etc. may be utilized instead of the buttons 104-110 illustrated in the embodiment of FIG. 1.

In one embodiment, the thermostat 100 also includes operating mode visual indicators 112, 114, 116. These indicators 112-116 can be used provide a visual indication of the current operating mode of the thermostat if so desired by the user. If selected for usage by the consumer, indicator 112 will illuminate while the thermostat 100 is operating in the cooling mode. Indicator 116 will illuminate while the thermostat 100 is operating in the heating mode. Finally, indicator 114 will illuminate to indicate that the fan is operating. Depending on the particular application, this indicator 114 may illuminate whenever the fan is running, or may illuminate only when the fan is selected to run continuously. These indicators may also be turned off so as to not annoy the consumer and/or to conserve energy, particularly in embodiments of the present invention wherein the thermostat is battery powered. In each of these embodiments, the display system of the present invention provides the user with the ability to control the intensity of these indicators 112-116 so as to not annoy the user.

In embodiments of the present invention that do not utilize automated switching control between the heating and cooling modes of operation, these indicators 112-116 may operate as user selectable switches to allow the consumer to select the operating mode of the thermostat 100. For example, during the summer months the consumer may select the cooling mode by depressing indicator 112. In this mode, the furnace will not be turned on even if the interior ambient temperature drops below the set point. To switch from the cooling to the heating mode of operation, the consumer, in this alternate embodiment, would need to select indicator 116 to allow the thermostat 100 to operate the furnace. Consumer selection in this embodiment of indicator 114 would operate the fan continuously, as opposed to its normal automatic operation based upon a call for cooling or heat by the thermostat 100. In a still further embodiment of the present invention, the indicators 112-116 may also be utilized to provide a visual indication of system trouble, or that there is a system reminder message being displayed on user screen 102.

Having discussed the physical structure of one embodiment of a thermostat 100 constructed in accordance with the teachings of the present invention, the discussion will now focus on the display system which forms an aspect of the present invention. Indeed, while the following discussion will utilize the structure of the thermostat 100 illustrated in FIG. 1, those skilled in the art will recognize that various other structures can be utilized without departing from the spirit and scope of the present invention. That is, regardless of the user input mechanisms utilized by the particular embodiment of the thermostat 100 of the present invention, the programmatic steps and display information provided in the following discussion may be used.

Figure 2:
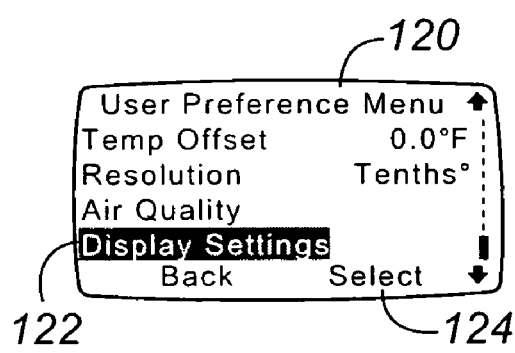
FIGS. 2-5 illustrate user display screens generated by the display system of the present invention and usable with the embodiment of the thermostat of the present invention illustrated in FIG. 1.

In one embodiment of the display system of the present invention utilized with the thermostat 100 illustrated in FIG. 1, the control and adjustment of the intensity of the LED indicators 112, 114, 116 and/or the backlit user display screen 102 may be accomplished through a user preference menu 120 such as that illustrated in FIG. 2. In such a user preference menu 120, the user would scroll through the list of available options using selection keys 108, 110 until the appropriate option were highlighted. In the illustration of FIG. 2, display settings option 122 corresponding with adjustment of the illumination of the user display screen is highlighted. In another embodiment of the present invention, this option may control the illumination of all illuminable elements of the thermostat. In a still further embodiment of the present invention, each illuminable element has its own settings option on the user preferences menu 120. Once the user has selected the desired option, the user would select soft key 106 in proximity to the select functionality 124.

Figure 3:
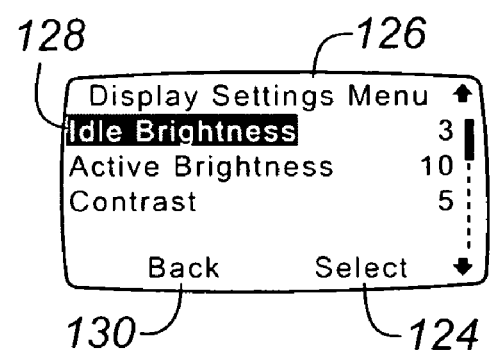

Once the user has selected the display settings option 122 from the user preference menu 120, the display settings menu screen 126 illustrated in FIG. 3 will be displayed on the user display screen 102. Such a display settings menu 126 includes a plurality of options in the present embodiment that allows the user, via this menu driven interface, to programmatically control the illumination of the backlit user display screen 102 and/or the LED indicators 112, 114, 116.

In one embodiment of the present invention, the display system allows for individual control of each of the illuminable elements of the thermostat 100. In an alternate embodiment of the present invention, the display system allows separate control of the illumination of the backlit user display screen 102 and the indicators 112, 114, 116 as a group. In a still further embodiment of the present invention, the illumination control of all illuminable elements is accomplished through one set of parameter settings.

In addition to providing illumination control for the elements themselves, i.e., the backlit user display screen 102 and/or indicators 112, 114, 116, a preferred embodiment of the present invention also allows for control of the illumination of these elements during different operational modes. That is, the system of the present invention recognizes that, for example, a user may desire the illumination of the backlit user display screen 102 to be different during different modes of operation of the thermostat. For example, the system of the present invention allows a user to set a different level of intensity for the backlit user display screen while the thermostat is idle, when an active user interaction is taking place, when a warning message is displayed, etc. This allows a user to control each aspect of the illumination of the various elements of the thermostat 100 for each of the different modes of operation in which the thermostat may operate.

In this example, the user may program the display system of the present invention to provide very subdued illumination of the various elements of the thermostat during all "normal" modes of operation so as to not be annoyed by the intensity of the illumination under such normal operating conditions. However, the user may program the display system of the present invention to provide full intensity of the illumination of the elements of the thermostat 100 if erroneous operation has been detected necessitating immediate user intervention to restore proper operation of the heating and/or cooling system. That is, while the user may not wish to be annoyed by display illumination during normal operation, the user is willing to be disturbed when such disturbance is necessary to maintain proper comfort and control within the dwelling.

In the embodiment of the present invention utilizing the display settings menu 126 illustrated in FIG. 3, adjustment of the individual display options will now be described in relation to the adjustment of the idle brightness setting 128. Any one of the individual display settings may be selected by scrolling through the list of available options via selection keys 108, 110. Once the desired option is highlighted, the user would select soft key 106 in proximity to the select functionality 124 to access the parameter-setting menu available for that particular option. If the user wishes to return to the user preference menu, the user would simply select soft key 104 in proximity to the back functionality 130.

Figure 4:
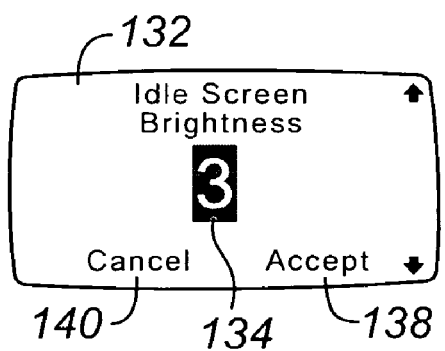
Figure 5:
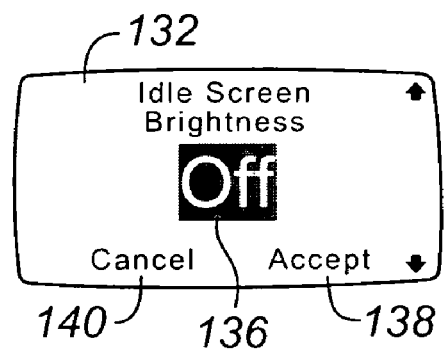

Assuming that the user has highlighted the idle brightness option 128 on the display settings menu 126, the idle screen brightness menu 132 illustrated in FIG. 4 is displayed. On this exemplary embodiment of an idle screen brightness menu 132, the currently selected or default parameter 134 is highlighted. The user then has the option to change this parameter via selection keys 108, 110 to scroll through the list of available options for this parameter. In the embodiment of the display system illustrated in FIG. 4, the user is able to scroll through a parameter list from ten to one representing various levels of intensity, and, as illustrated in FIG. 5, an off setting 136. This off setting 136 allows the user to turn off the illumination for the selected element or during the selected mode of operation if this is their desire.

Once the user has scrolled to the desired parameter for this setting, the user would simply depress soft key 106 in proximity to the accept functionality 138 to accept this new parameter setting. If the user chooses to cancel the adjustment to this parameter, the user would simply depress soft key 104 in proximity to the cancel functionality 140 to cancel the adjustment of this parameter. In one embodiment of the present invention, upon accepting or canceling the adjustment of the particular parameter, the display system of the present invention returns the user to the display settings menu 126 illustrated in FIG. 3 to allow additional adjustments to other parameters.

In one embodiment of the present invention, the thermostat 100 includes a pulse width modulated (PWM) illumination control to drive the LED indicators 112, 114, 116 and/or the intensity of the illumination of the backlit user display screen 102. Once the user has selected the desired parameter for each of the various options to control the intensity of the illuminable elements of thermostat 100, the software of the thermostat can, via the PWM control, adjust the intensity of the indicators and/or backlight from 100% to completely off by varying the duty cycle. This intensity adjustment may be accomplished in various discreet steps in one embodiment of the present invention, while another embodiment of the present invention allows continuous adjustment between these display intensity end points. These other intensities may not be as annoying to the user, while still allowing the indicators 112, 114, 116 and/or the backlit user display screen 102 to perform the functionality for which they were originally intended.

In an alternate embodiment of the present invention, the thermostat 100 includes an adjustable current drive illumination control to drive the LED indicators 112, 114, 116 and/or the intensity of the illumination of the backlit user display screen 102. Once the user has selected the desired parameter for each of the various options to control the intensity of the illuminable elements of thermostat 100, the software of the thermostat can, via the adjustable current drive illumination control, adjust the intensity of the indicators and/or backlight from 100% to completely off by varying the current supplied to these indicators. This intensity adjustment may be accomplished in various discreet steps in one embodiment of the present invention, while another embodiment of the present invention allows continuous adjustment between these display intensity end points. These other intensities may not be as annoying to the user, while still allowing the indicators 112, 114, 116 and/or the backlit user display screen 102 to perform the functionality for which they were originally intended.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A thermostat for controlling heating and/or cooling equipment, comprising:
    a backlit user display screen for displaying operational information about the heating and/or cooling equipment controlled by the thermostat;
    wherein the thermostat is configured to vary an illumination intensity of the backlit user display screen based on a user programmable illumination parameter;
    wherein the thermostat includes an idle mode and an active mode, wherein when the thermostat is in the idle mode the illumination intensity of the backlit user display screen is based on a user programmable active mode parameter and when the thermostat is in the active mode the illumination intensity of the backlit user display screen is based on a user programmable idle mode parameter; and
    wherein the user programmable active mode parameter is independent of the user programmable idle mode parameter such that the illumination intensity of the active mode may be varied to a lower illumination intensity than the illumination intensity of the idle mode.

2. The thermostat of claim 1, further comprising a display settings menu displayed on the backlit user display screen, the display settings menu including at least one user programmable operational mode illumination parameter, and wherein the thermostat is configured to vary the illumination intensity of the backlit user display screen during at least one operational mode based on the user programmable operational mode illumination parameter.

3. The thermostat of claim 2, further comprising:
    a user function selection means for inputting a user selection associated with a function indicated on the user display screen;

a user scrolling means for allowing a user to scroll among available items and parameters; and wherein one of the at least one user programmable operational mode illumination parameters are highlighted via the user scrolling means and selected via the user function selection means for programming.

4. The thermostat of claim 3, further comprising a parameter setting menu for a selected one of the at least one user programmable operational mode illumination parameters, and wherein a value of the user programmable operational mode illumination parameter is settable via the user scrolling means.

5. The thermostat of claim 1, wherein the user programmable illumination parameter is set to off, and wherein the thermostat is configured to turn off illumination of the backlit user display screen.

6. The thermostat of claim 1, wherein the thermostat is configured to pulse width modulate the illumination of the backlit user display screen at a duty cycle based on the user programmable illumination parameter.

7. The thermostat of claim 1, wherein the thermostat is configured to vary the current supplied to the backlit user display screen to control the illumination thereof based on the user programmable illumination parameter.

8. The thermostat of claim 1, further comprising:
at least one indicator separated from and spaced apart from the backlit user display screen; and
wherein the thermostat is configured to vary an illumination intensity of the at least one indicator based on the user programmable illumination parameter.

9. The thermostat of claim 8, wherein the at least one indicator is a light emitting diode (LED) indicator.

10. The thermostat of claim 9, wherein the thermostat is configured to pulse width modulate the illumination of the at least one LED indicator at a duty cycle based on the user programmable illumination parameter.

11. The thermostat of claim 1, further comprising:
at least one indicator separated from and spaced apart from the backlit user display screen; and
wherein the thermostat is configured to vary an illumination intensity of the at least one indicator based on a user programmable indicator illumination parameter, different than the user programmable illumination parameter.

12. The thermostat of claim 11, wherein the at least one indicator is a light emitting diode (LED) indicator.

13. The thermostat of claim 12, wherein the thermostat is configured to pulse width modulate the illumination of the at least one LED indicator at a duty cycle based on the user programmable indicator illumination parameter.

14. A thermostat for controlling heating and/or cooling equipment, comprising:
a backlit user display screen for displaying operational information about the heating and/or cooling equipment controlled by the thermostat;
wherein the thermostat is configured to vary an illumination intensity of the backlit user display screen based on a user programmable illumination parameter;
wherein the at least one user programmable operational mode illumination parameter includes at least one user programmable normal operation parameter and at least one user programmable erroneous operation parameter, and wherein the thermostat is configured to vary the illumination intensity of the backlit user display screen during normal operation based on the at least one user programmable normal operation parameter, and wherein the thermostat is configured to vary the illumination intensity of the backlit user display screen during erroneous operation based on the at least one user programmable erroneous operation parameter; wherein the thermostat is configured to vary the illumination of the backlit user display screen when switching from the normal operation mode to the erroneous operation mode based on the user programmable normal operation parameter and the user programmable erroneous operation parameter without any manipulation of the thermostat by a user.

* * * * *